(12) United States Patent
Schober et al.

(10) Patent No.: US 9,555,675 B2
(45) Date of Patent: Jan. 31, 2017

(54) FLEXIBLE SENSOR SUPPORT FOR TIRE INSPECTION

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH)

(72) Inventors: Bradley D. Schober, Greer, SC (US); Frank E. Gramling, Simpsonville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/417,567

(22) PCT Filed: Nov. 19, 2012

(86) PCT No.: PCT/US2012/065802
§ 371 (c)(1),
(2) Date: Jan. 27, 2015

(87) PCT Pub. No.: WO2014/077846
PCT Pub. Date: May 22, 2014

(65) Prior Publication Data
US 2015/0191057 A1    Jul. 9, 2015

(51) Int. Cl.
*G01M 17/02* (2006.01)
*B60C 23/04* (2006.01)
*B60C 19/00* (2006.01)

(52) U.S. Cl.
CPC ........... *B60C 23/0493* (2013.01); *B60C 19/00* (2013.01); *G01M 17/02* (2013.01); *B60C 2019/004* (2013.04)

(58) Field of Classification Search
None
See application file for complete search history.

(56) References Cited

U.S. PATENT DOCUMENTS 3,869,908 A    3/1975    Driendl
4,672,805 A    6/1987    Moritz
(Continued)

FOREIGN PATENT DOCUMENTS

CH    FR 2899149 A1 *    10/2007    ......... B60C 23/0493
CH    FR 2967613 A1 *    5/2012    ......... B60C 23/0493
(Continued)

OTHER PUBLICATIONS

PCT International Search Report for PCT/US2012/065802, dated Feb. 7, 2013.
(Continued)

*Primary Examiner* — Andre Allen
(74) *Attorney, Agent, or Firm* — Dority & Manning, P.A.

(57) ABSTRACT

A sensor support is provided for tire inspection or testing that can be used over a range of tire profiles and widths to place one or more sensors at a surface of the tire. The shape or profile of the sensor support is adjustable to accommodate tire surfaces of different shapes or profiles. A locking feature can be provided to maintain the shape of the sensor support during use.

15 Claims, 8 Drawing Sheets

(56) References Cited

U.S. PATENT DOCUMENTS

| | | | |
|---|---|---|---|
| 5,060,173 A | 10/1991 | Tsuji | |
| 5,445,569 A | 8/1995 | Blasé | |
| 5,637,926 A | 6/1997 | Zedonis | |
| 6,107,565 A | 8/2000 | O'Rourke | |
| 6,119,836 A | 9/2000 | Blasé | |
| 6,984,782 B2 | 1/2006 | Ikeda et al. | |
| 7,220,330 B2 | 5/2007 | Tub et al. | |
| 7,235,967 B2 | 6/2007 | Nishimizu et al. | |
| 7,441,452 B2 | 10/2008 | Phalak et al. | |
| 7,523,656 B1 | 4/2009 | Blixhavn | |
| 7,673,440 B2 | 3/2010 | Blasé et al. | |
| 7,730,772 B2 | 6/2010 | Cook et al. | |
| 7,909,080 B2 | 3/2011 | Weaver | |
| 9,310,265 B2 * | 4/2016 | Shimoyama | G01L 1/04 |
| 2003/0058118 A1 | 3/2003 | Wilson | |
| 2006/0170420 A1 | 8/2006 | Nishimizu et al. | |
| 2007/0013503 A1 * | 1/2007 | Chien | B60C 23/0408 340/447 |
| 2011/0074564 A1 * | 3/2011 | Hirabayashi | B60C 23/0411 340/447 |
| 2012/0112898 A1 * | 5/2012 | Yu | B60C 23/0493 340/442 |
| 2012/0137761 A1 | 6/2012 | Dardelin | |
| 2014/0060207 A1 * | 3/2014 | Yang | G01L 1/00 73/862.041 |
| 2014/0118134 A1 * | 5/2014 | Won | B60C 23/0498 340/442 |
| 2015/0097662 A1 * | 4/2015 | Yu | B60C 23/0493 340/442 |
| 2016/0231201 A1 * | 8/2016 | Schober | B29D 30/0061 |

FOREIGN PATENT DOCUMENTS

| | | | |
|---|---|---|---|
| DE | 2310144 | 3/1973 | |
| EP | 1 955 843 | 8/2008 | |
| FR | 2839016 | 10/2003 | |
| FR | 2875065 | 3/2006 | |
| JP | H05107004 | 4/1993 | |
| JP | H11183441 | 7/1999 | |
| JP | EP 1510370 A1 * | 3/2005 | B60C 23/0408 |
| JP | 2011178333 | 9/2011 | |
| TW | KR 20120038666 A * | 4/2012 | B60C 23/0493 |
| WO | WO 2011/127331 | 10/2011 | |
| WO | WO 2012/036673 | 3/2012 | |
| WO | WO 2012/036674 | 3/2012 | |

OTHER PUBLICATIONS

Extended European Search Report for PCT/US2012065802, dated Jun. 10, 2016, 9 pages.

* cited by examiner

FLEXIBLE SENSOR SUPPORT FOR TIRE INSPECTION

FIELD OF THE INVENTION

The subject matter of the present disclosure relates generally to a flexible sensor support that can be used to position one or more sensors at a tire surface and has a flexible, adjustable shape for use with tires varying over a range of widths and profiles.

BACKGROUND OF THE INVENTION

A known tire construction uses reinforcement cords or support elements that extend from bead to bead through the sidewall, shoulder, and tread sections of the tire. Sometimes referred to collectively as the tire carcass, these cords are typically anchored in the beads and maintain the overall shape of the tire as the tire is inflated and used. Such cords are usually oriented substantially along the radial direction (a direction perpendicular to the axis of rotation) and can include e.g., a ferrous metal.

During use of the tire, these cords may be damaged e.g., from impact with objects in the roadway, travel over curbs, and other damaging events. In some situations, the cords may be completely broken during such an event. Unfortunately, this damage may not be readily discoverable from a visual inspection of the exterior of the tire because the cords are contained within the rubber materials used to construct the tire.

Commercial tires are commonly reused after a process referred to as retreading. With retreading, worn tread is removed from the tire and a new tread belt or tread section is installed onto the tire. Replacement of the tread is less expensive than replacing the whole tire and allows additional mileage to be obtained using the same tire carcass.

Before replacing the tread, however, it is advantageous to inspect the tire, including the cords of the carcass for damage or wear. In certain situations, inspection may reveal that replacement or other repair of the tire is required rather than retreading. However, as stated above, not all damage to interior elements such as e.g., the cords of the carcass are readily apparent from a visual inspection alone.

As the cords for commercial tires such as heavy truck tires are frequently constructed from a ferrous material, one or more sensors can be used to detect cord breaks not otherwise ascertainable from a visual inspection of the tire. It is desirable to automate such an inspection process so that multiple tires may be inspected economically and expediently. However, tires come in a variety of shapes and sizes. More specifically, the profile and width (along the axial direction) can vary substantially from tire to tire. Some sensors require placement at the surface of the tire either in contact with the tire or in close proximity thereto. Accordingly, challenges exist with accurately and consistently positioning one or more sensors over a range of tire profiles and widths so as to detect e.g., damage to the cords of the carcass.

Therefore, a device that can be properly positioned at the surface of the tire to facilitate inspection of the tire would be useful. More particularly, a device that can properly position one or more sensors along the surface of a tire over a range of tire profiles and widths would be beneficial. Such a device that can be used with a variety of different sensor types would also be useful.

SUMMARY OF THE INVENTION

The present invention provides a sensor support for tire inspection or testing that can be used over a range of tire profiles and widths to place one or more sensors at a surface of the tire. The shape or profile of the sensor support is adjustable to accommodate tire surfaces of different shapes or profiles. A locking feature can be provided to maintain the shape of the sensor support during use. Additional objects and advantages of the invention will be set forth in part in the following description, or may be apparent from the description, or may be learned through practice of the invention.

In one exemplary embodiment of the present invention, a sensor support is provided that is removably positionable near a surface of a tire. The sensor support includes a flexible substrate defining a longitudinal direction. The flexible substrate is bendable along the longitudinal direction between a first position and a second position. A biasing member is attached to the substrate and is configured for urging the substrate towards the first position. A locking member is positioned proximate to the flexible substrate and is configured for holding the flexible substrate in a second position wherein the flexible substrate conforms to a profile of the surface of the tire. At least one flexibly supported sensor is attached to the flexible substrate. The sensor is configured for detecting damage at or below the surface of the tire.

In still another exemplary embodiment, the present invention provides an adjustable sensor support for use in tire inspection. The sensor support defines longitudinal and lateral directions. The sensor support includes a flexible substrate configured for bending along the longitudinal direction to adjust to a shape of a surface of the tire. The flexible substrate includes a plurality of interlocking elements attached to each other and rotatable relative to each other along the longitudinal direction. A biasing member is attached to the substrate and is configured for urging the substrate against bending along the longitudinal direction. A plurality of sensors are arranged along a longitudinal direction and are supported by the flexible substrate. The sensors are configured for detecting damage to the tire.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 6 and 7 are top views of the exemplary sensor support of FIG. 2. FIG. 6 shows a locking feature in an engaged position with the sensor support whereas FIG. 7 shows a locking feature in a disengaged position.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Figure 1:
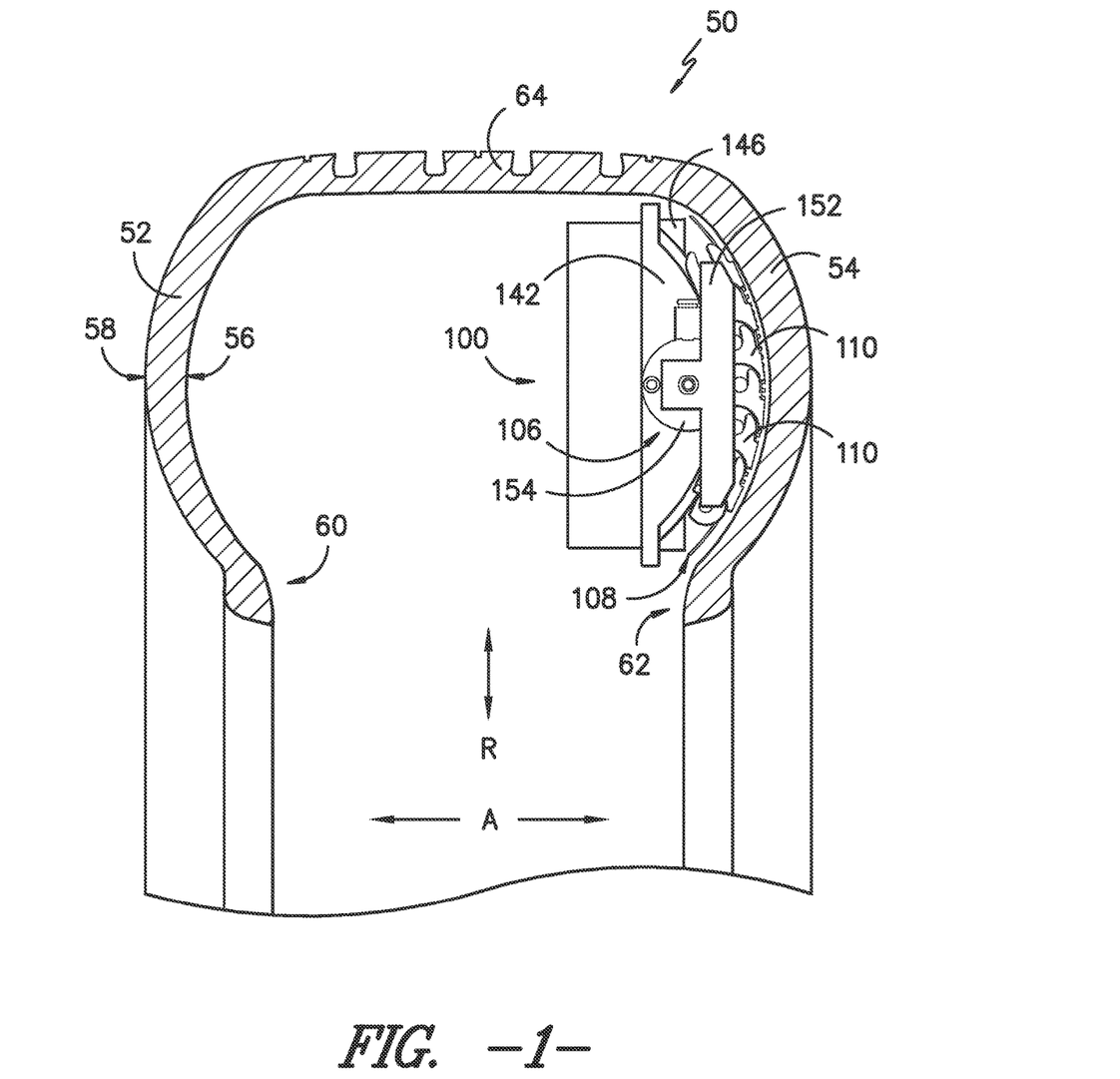
FIG. 1 illustrates a cross-sectional view of an exemplary tire with a side view of an exemplary embodiment of a sensor support of the present invention positioned at an interior surface of the tire.

FIG. 1 illustrates a cross-sectional view of an exemplary tire 50 with a side view of an exemplary embodiment of a sensor support 100 of the present invention positioned at an inner surface 56 of tire 50 for purposes of inspection. The construction of tire 50 includes cords (not shown) that extend along radial direction R from bead section 60, through sidewall 52, along the axial direction A through tread section 64, and along radial direction R through sidewall 54 to bead section 62. Cords 50 are constructed from a ferrous material, are embedded in the materials used to construct tire 50, and can be damaged during use of tire 50 as previously described.

For this exemplary embodiment, sensor support 100 includes at least one flexibly supported sensor 108 that is positioned at the inner surface 56 of tire 50 along sidewall 54. Sensor support 100 can be positioned so that sensor 108 is in contact with inner surface 56 or in close proximity thereto. As shown in FIG. 1, the profile or shape of sensor support 100—particularly along sensor 108—matches the profile of inner surface 56 of tire 50 along sidewall 54.

By way of example, during inspection, tire 50 is rotated past sensor support 100 with sensor 108. As will be further described, sensor 108 is configured to detect damage, e.g., breaks, in the cords of tire 50. The positioning of sensor support 100 shown in FIG. 1 is provided by way of example only. Sensor support 100 can also be positioned along inner surface 56 at sidewall 52. In still other embodiments, sensor support 100 can be configured for positioning along the external surface 58 at sidewall 52 or 54. Sensor support 100 can be hand-held or can be placed into position by a mechanical device.

A representative tire width and profile is shown in FIG. 1 with tire 50. However, one of skill in the art will understand that tires are manufactured with a range of profiles and widths which e.g., affects the curvature or shape of sidewalls 52 and 54 and, therefore, the profile or shape of inner surface 56 and outer surface 58. Depending upon the type of sensor 108 employed, accuracy and/or consistency of the inspection process over a range of tire widths and profiles can be affected by whether sensor support 100 can be repeatedly located at a fixed position along an inner or outer surface of each tire. Furthermore, some sensors require placement in contact with, or in close proximity to, a surface of the tire. The sensor support of the present invention has a profile that can be adjusted to match the profile or shape of a tire surface—particularly along the curved sidewall—so that one or more sensors can be accurately and consistently positioned at or near the tire surface.

Figure 3:
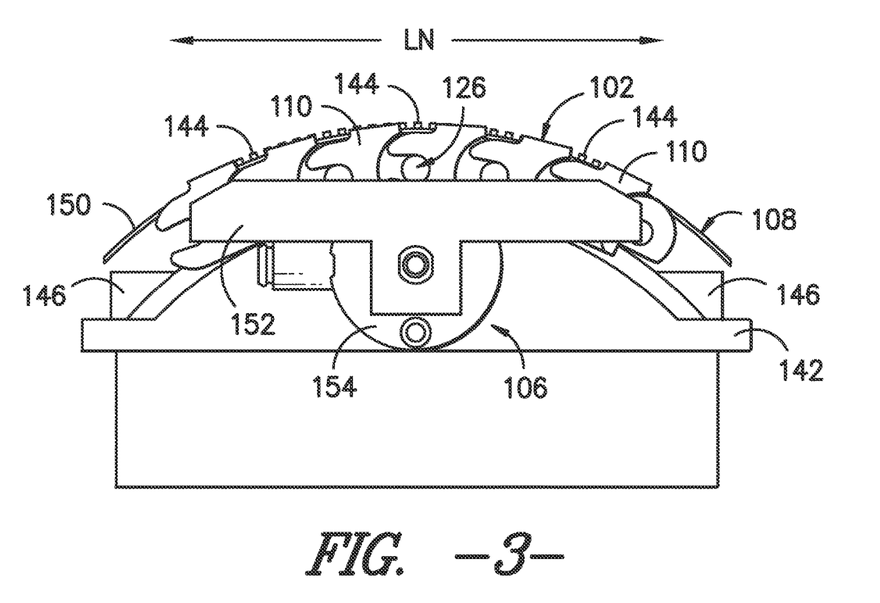
FIG. 3 provides a side view of the exemplary sensor support of FIG. 2.
Figure 4:
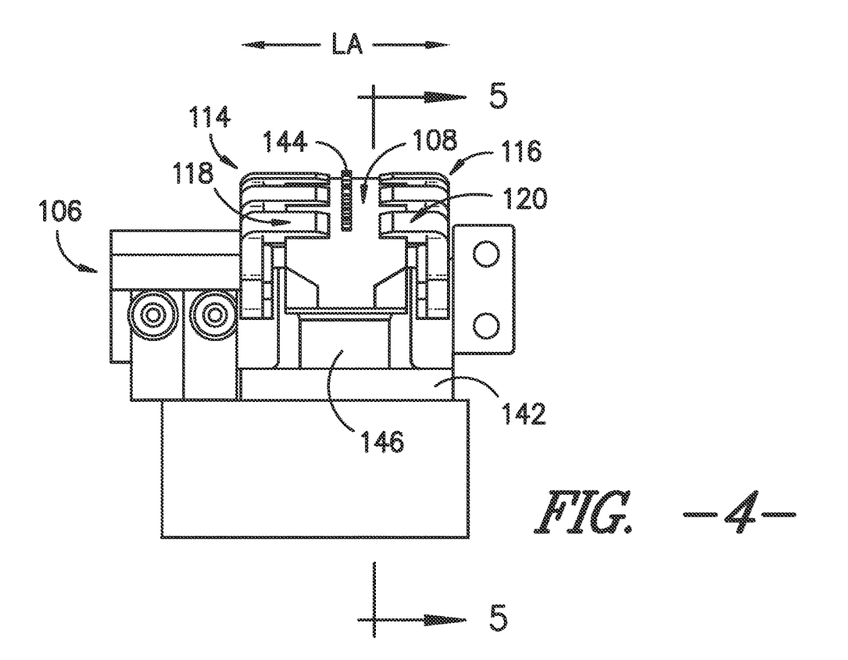
FIG. 4 provides an end view of the exemplary sensor support of FIG. 2.
Figure 5:
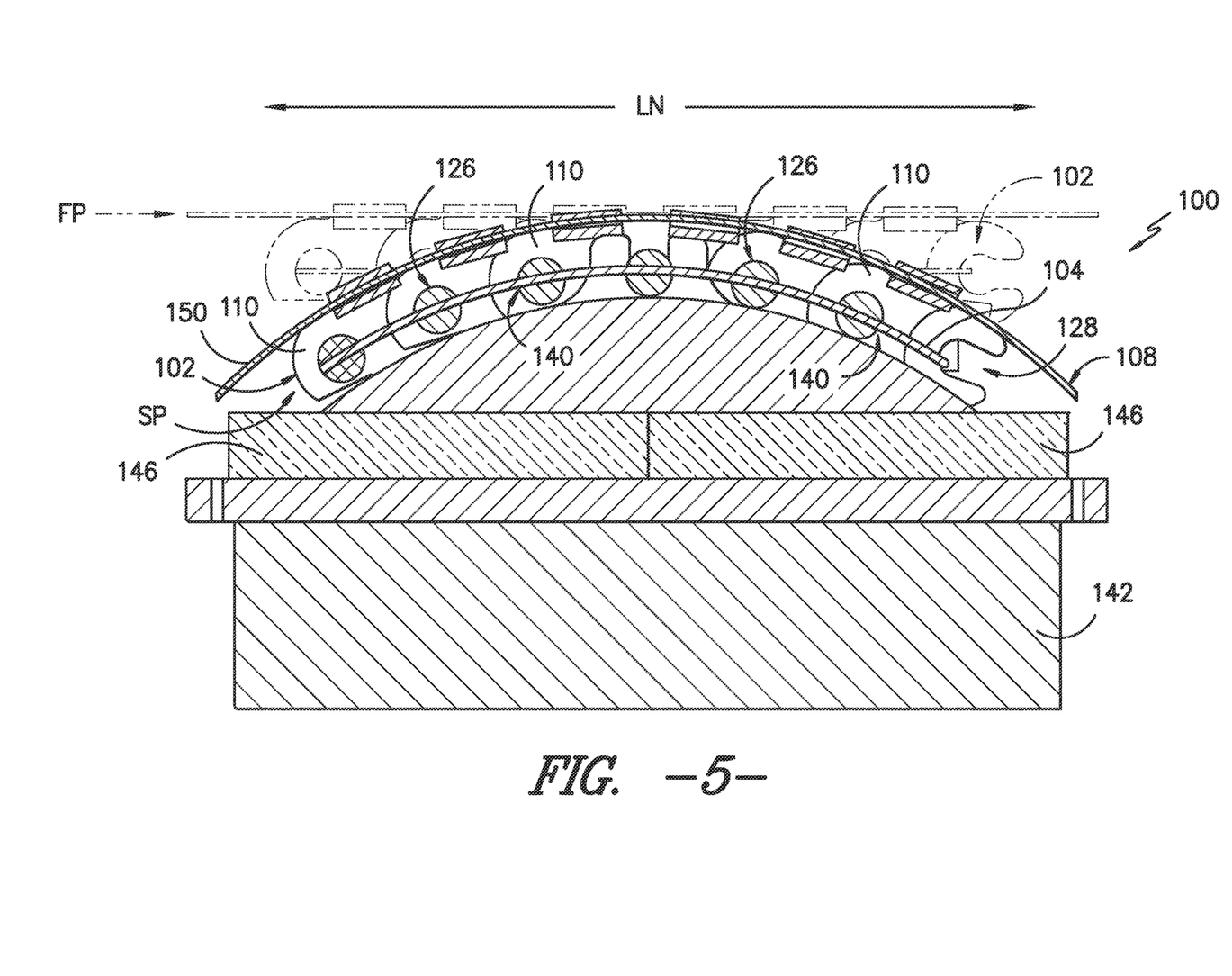
FIG. 5 is a cross-sectional view of the exemplary sensor support of FIG. 2 with dashed lines indicating a first position for the exemplary sensor support.

Referring now to FIGS. 2, 3, 4, and 5, sensor support 100 includes a flexible substrate 102 that extends along a longitudinal direction LN. As illustrated in FIG. 5, flexible substrate 102 is constructed for bending (i.e. to be selectively bendable) along the longitudinal direction between a first position FP (shown in dashed lines) and a second position SP. This flexibility allows sensor support 100 to be shaped to match the profile of a tire surface during inspection. It should be understood that first position FP and second position SP are shown by way of example—i.e. the flexibility of sensor support 100 allows it to assume profiles have more or less curvature than what is shown in FIG. 5. More particularly, second position SP can be at the position shown in FIG. 5 or at positions with more or less curvature as well. Although shown as linear in FIG. 5, flexible substrate 102 could also have a first position FP that includes curvature along the longitudinal direction LN.

Figure 11:
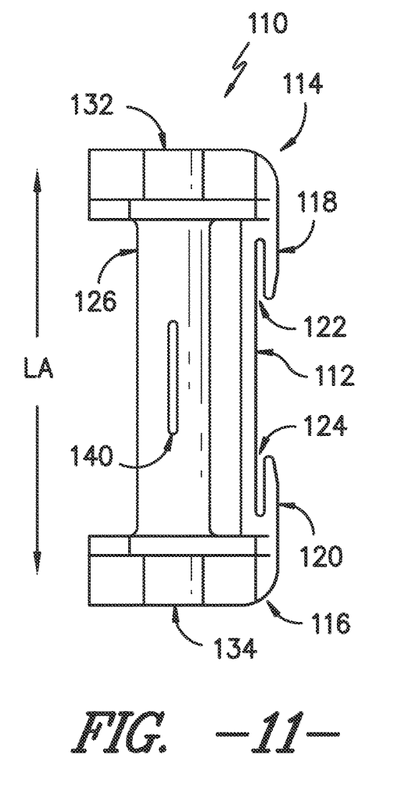
FIGS. 11, 12, and 13 are end, top, and side views, respectively, of an exemplary embodiment of an interlocking member of the present invention.
Figure 12:
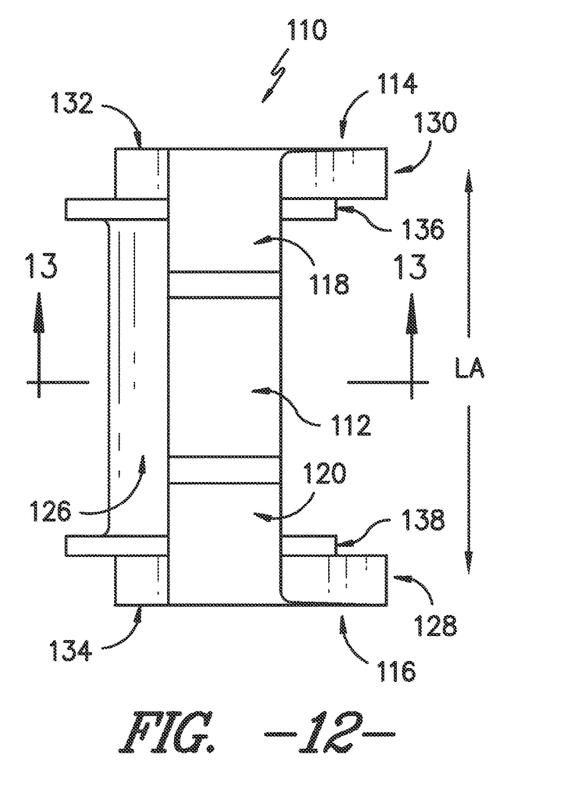
Figure 13:
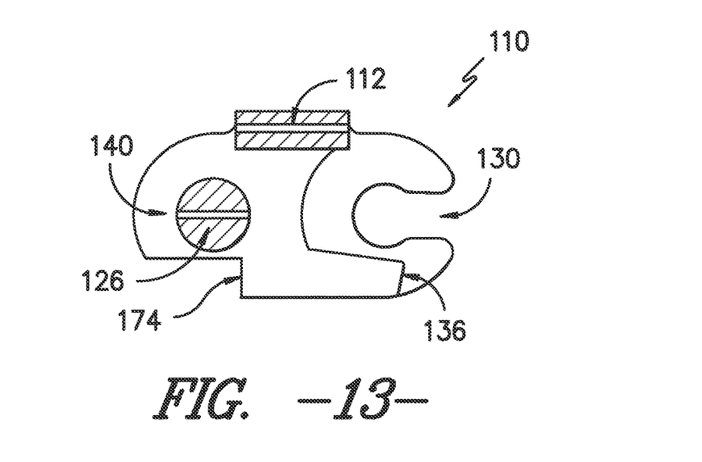

Flexible substrate 102 is constructed from a plurality of interlocking members 110 that are connected together along longitudinal direction LN and are rotatable relative to each other. Referring now to FIGS. 11, 12, and 13, one or more of the interlocking members 110 include an axle 126 having ends 132 and 134 and extending along lateral direction LA between opposing sides 114 and 116 of member 100. A pair of jaws 128 and 130 are positioned on opposing sides 114 and 116. Each jaw 128 and 130 is shaped to receive the axle 126 of an adjacent interlocking member 110 along the longitudinal direction LN. More particularly, for this exemplary embodiment, axle 126 is received in a snap-fit or complementary manner into jaws 128 and 130 but is still rotatable therein so that adjacent interlocking members 100 are rotatable relative to one another whereby flexible substrate 102 can bend along longitudinal direction LN.

The overall range of movement of interlocking members 110 relative to each other can be limited using stops positioned on opposing sides 114 and 116 at each jaw 128 and 130. Referring specifically to FIG. 13, for example, during rotation of adjacent interlocking members 10, the forward stop 136 of one interlocking member 110 will eventually contact a rear stop 174 of an adjacent interlocking member 110. The dimensions and shape of stops 136 and 174 can be modified to control the range of rotation of adjacent interlocking members 110 and thus the overall flexibility or bendability of sensor support 100 along longitudinal direction LN.

One or more of interlocking members 110 also includes a seat 112 extending along lateral direction LA between opposing sides 114 and 116 of a member 110. A pair of fingers 118 and 120 are positioned in an opposing manner at sides 114 and 116 and extend towards each other along lateral direction LA and over seat 112. As such, fingers 118 and 120 each define a slot 122 and 124, respectively.

Figure 2:
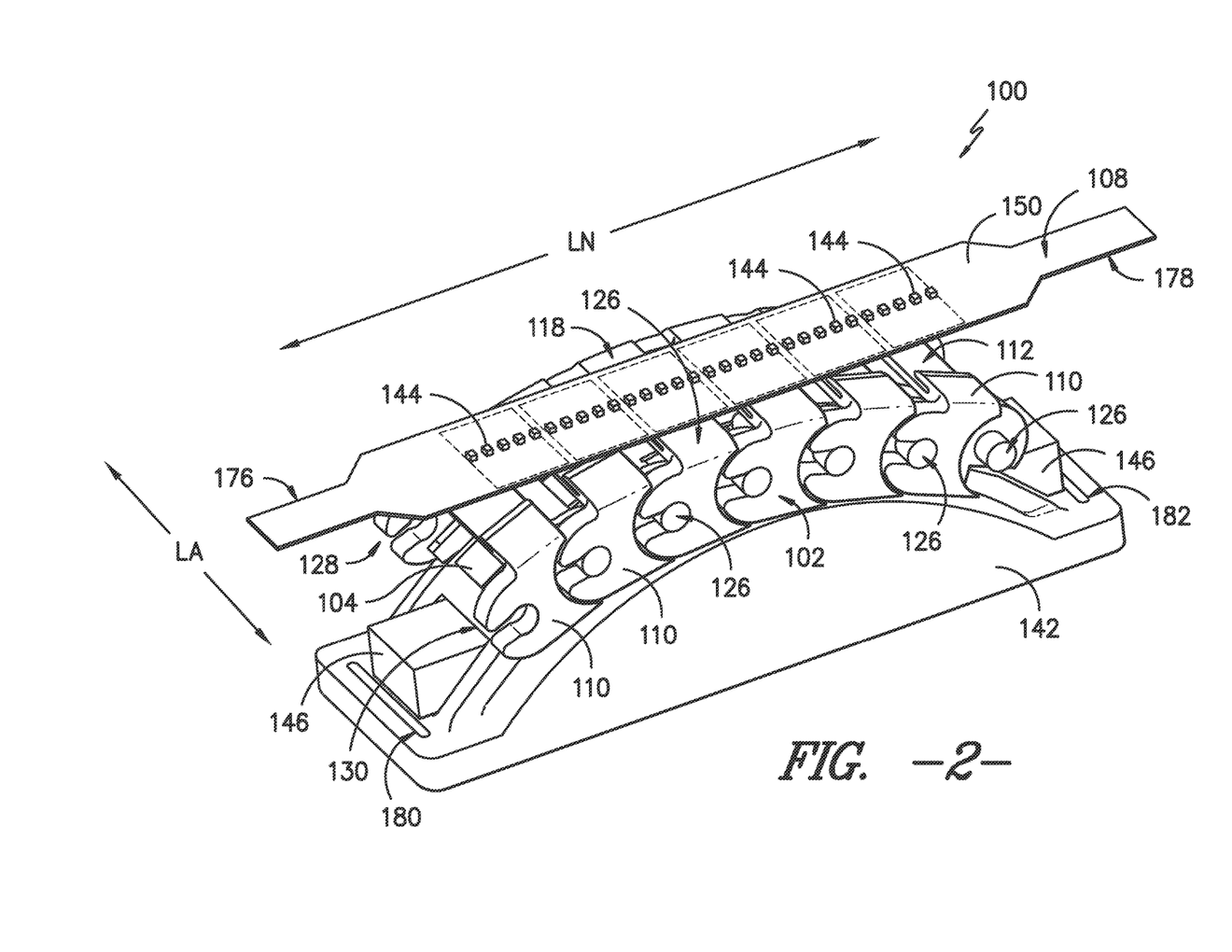
FIG. 2 illustrates a perspective view of an exemplary embodiment of a sensor support of the present invention. A flexible circuit board carrying multiple sensors is also shown before attachment to the sensor support as will be further described.

Referring now to FIGS. 3, 4, 5, 6, and 7, flexible supported sensor 108 is positioned within slots 122 and 124 and between seat 112 and pair of fingers 118 and 120 of adjacent interlocking members 110 of flexible substrate 102. During assembly, tabs 176 and 178 at the ends of flexible supported sensor 108 are inserted into slots 180 and 182 in base 142. Before insertion, flexibly supported sensor 108 may have a linear profile as shown in FIG. 2. After assembly, the operation of fingers 118 and 120 along with the insertion of tabs 178 and 178 will bend or shape flexibly supported sensor 108 to the profile taken by the rotation of interlocking members 110 of flexible substrate 102.

For this exemplary embodiment, sensor support 100 includes a biasing member 104 that is attached to, or that otherwise acts upon, flexible substrate 102. Axles 126 of one or more of the interlocking members 110 each include an aperture 140 as shown in FIGS. 5, 11, and 13. Referring now to FIGS. 2 and 5, biasing member 104 is received through multiple apertures 140 that are aligned along longitudinal direction LN. With this exemplary embodiment of sensor support 100, biasing member 104 is equipped as a leaf spring that urges or biases flexible substrate 102 towards first position FP shown in FIG. 5 and against bending of the flexible substrate from the first position FP. Thus, when flexible substrate 102 is bent away from first position FP towards second position SP, biasing member 104 will return flexible substrate 102 to first position FP unless flexible substrate 102 is locked into a particular shape or profile such as e.g., second position SP.

Figure 6:
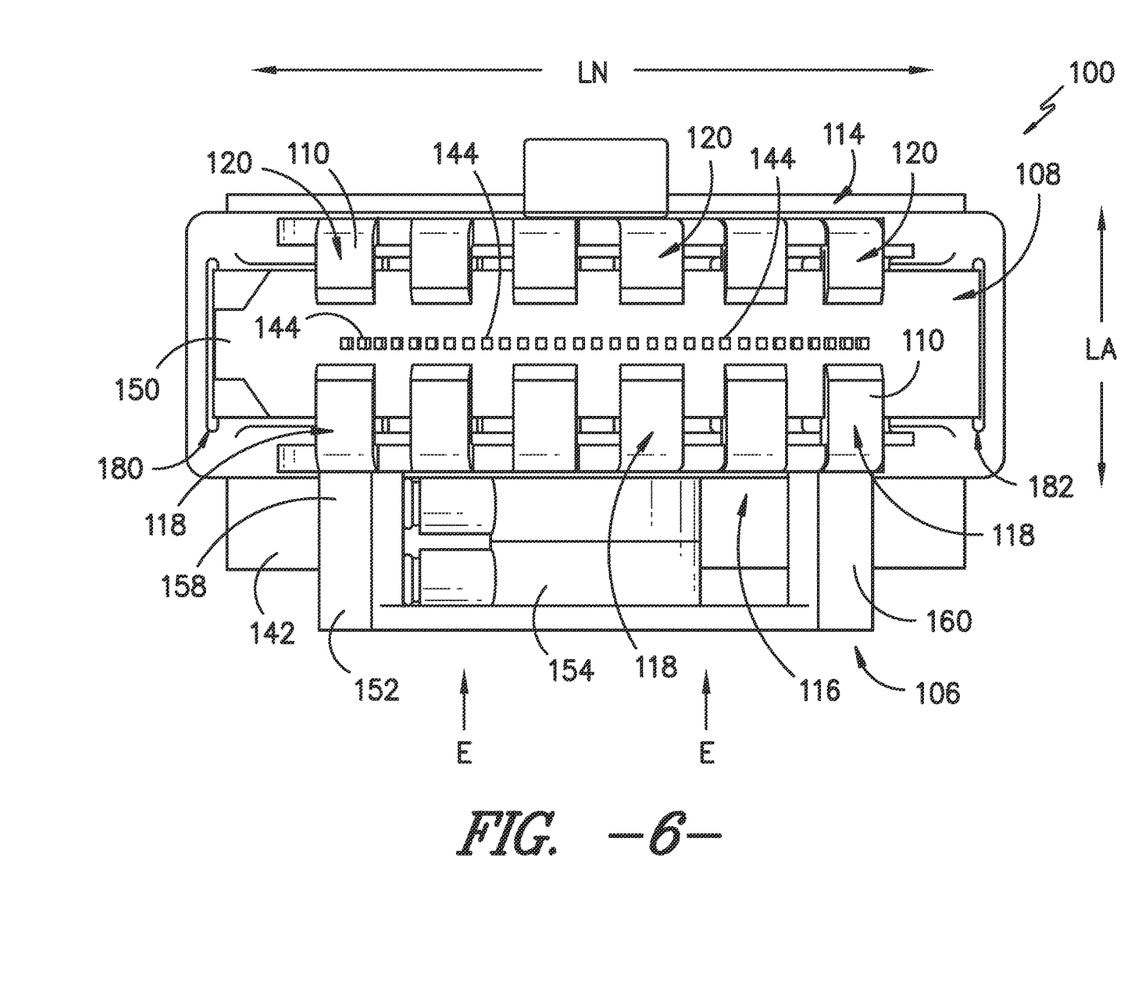
Figure 7:
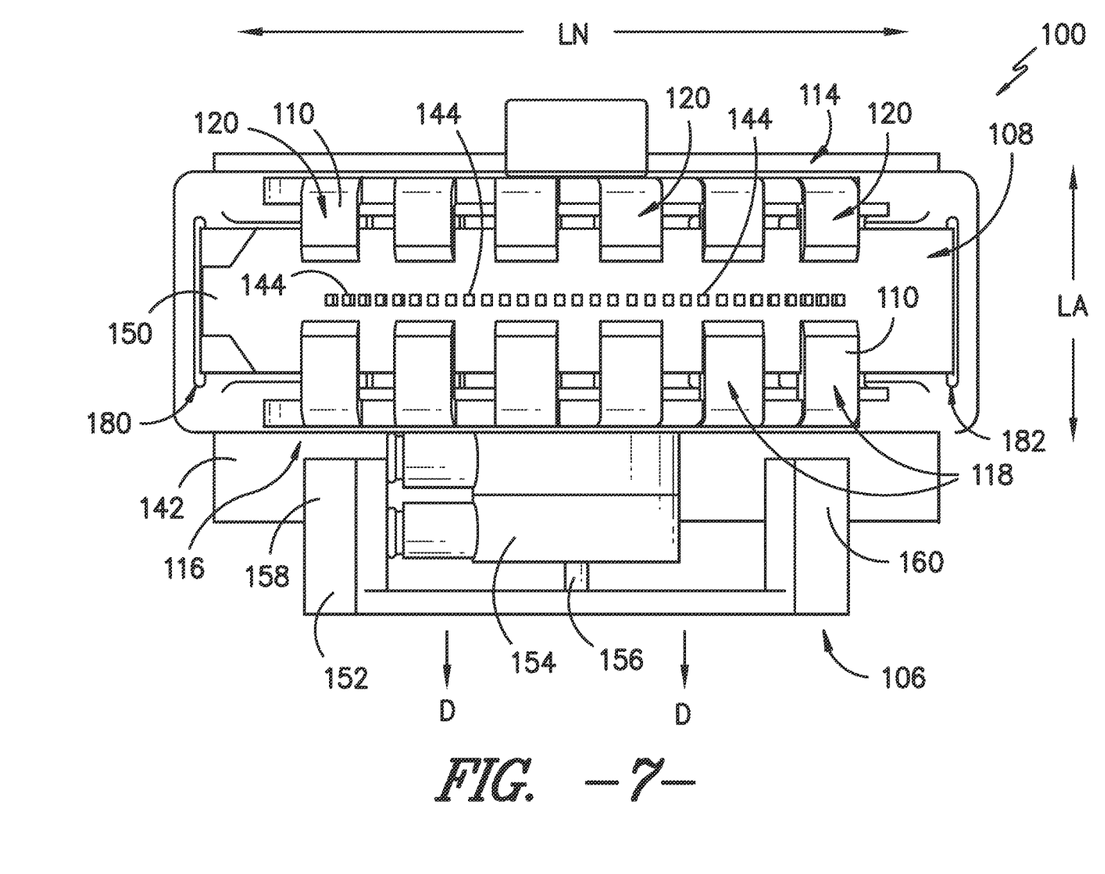

Accordingly, sensor 100 includes a locking member 106 as shown in FIGS. 4, 6, and 7. Locking member 106 can be used to fix or lock flexible substrate 102 into a particular profile or shape, which in turn fixes the shape or profile of flexibly supported sensor 108. For this exemplary embodiment, locking member 106 is supported by base 142 and includes a clamping member 152 having a pair of arms 156 and 160 that extend along lateral direction LA towards the plurality of interlocking members 110. Clamping member is connected to, and positioned by, a shaft 156 that is controlled by pneumatic cylinder 154.

During, for example, an inspection, pneumatic cylinder 154 can be activated to move clamping member 152 (arrows E in FIG. 6) from the unlocked position shown in FIG. 7 to the locked position shown in FIG. 6 where arms 156 and 160 will engage and immobilize interlocking members 110 of flexible substrate 102—thereby fixing the shape or profile thereof. Conversely, pneumatic cylinder can be activated to move clamping member 142 (arrows D in FIG. 7) from the locked position shown in FIG. 6 to the unlocked position shown in FIG. 7 where arms 156 and 160 are disengaged so that interlocking members 110 of flexible substrate 102 are free to rotate relative to each other. As such, biasing member 104 will urge flexible substrate 102 to return to the first position FP shown in FIG. 5.

Locking member 106 as shown in the figures is provided by way of example only. Other configurations or mechanisms for fixing the profile or shape of flexible substrate 102 may be used as well. Also, it should be understood that in other embodiments of the present invention, locking member 106 is not present. For example, in certain exemplary embodiments, the sensor support 100 is positioned against the surface of the tire and held in such position during inspection and/or testing. While held in position against the tire surface, the shape or profile of flexible substrate 102 and, therefore, flexibly supported sensor 108, will assume the profile of the tire surface. Still other techniques may be used as well.

Figure 8:
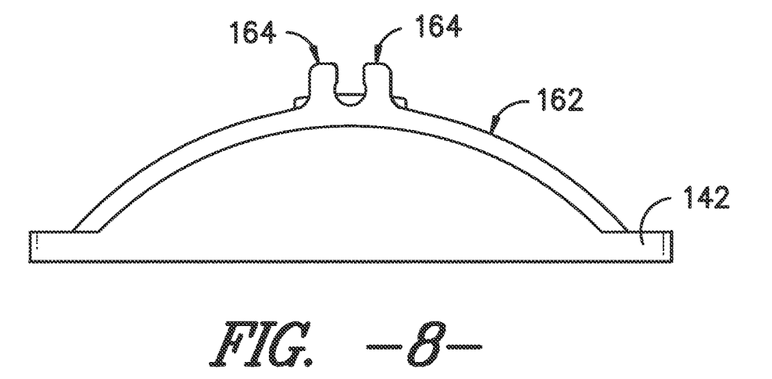
FIGS. 8, 9, and 10 are side, end, and perspective views, respectively, of an exemplary base of the sensor support shown in FIG. 2.
Figure 9:
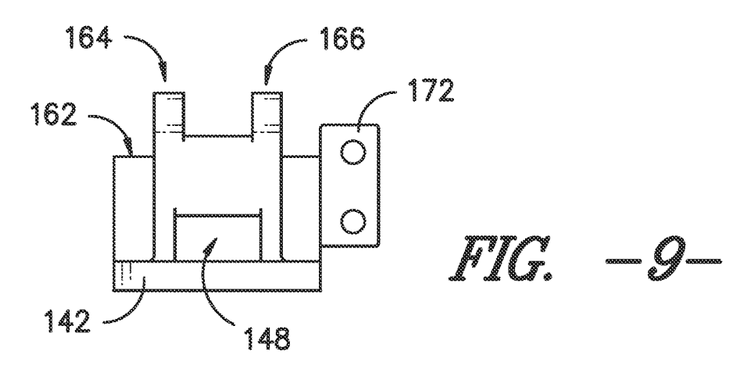
Figure 10:
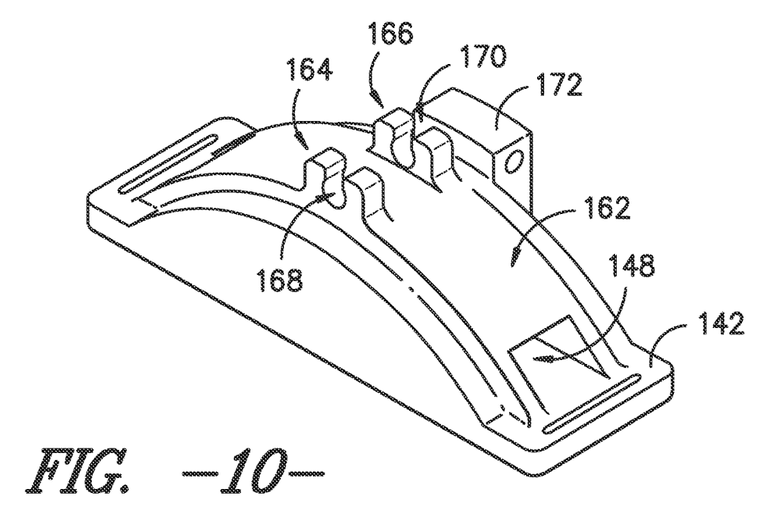

Flexible substrate 102 is rotatably supported by base 142 having a curved surface 162. As shown in FIGS. 8, 9, and 10, base 142 includes a pair of pivot arms 164 and 166 defining slots 168 and 170, respectively. Slots 168 and 170 receive an axle 126 of one of the interlocking members 110 and allow such axle 126 to rotate therein. As such, flexible substrate 102 can rotate or pivot about arms 164 and 166. For this exemplary embodiment, a bracket 172 is attached to base 142 and can be used to connect sensor support 100 with an arm or other device for positioning within a tire. Base 142 and bracket 172 as shown in the figures are provided by way of example only—other configurations may be used as well.

A variety of configurations and types may be used for flexibly supported sensor 108 depending upon, for example, the nature of the inspection or testing desired. A specific embodiment will now be described. However, using the teachings disclosed herein, one of skill in the art will understand that one or more sensors of other types and operation may be used as well.

As shown in FIGS. 2, 3, 6, and 7, for this exemplary embodiment of sensor support 100, flexibly supported sensor 108 includes a plurality of Hall Effect sensors 144 that are positioned in an arrangement that extends linearly along the longitudinal direction LN of the flexible substrate 102. Sensor 108 includes a flexible, printed circuit board 150 onto which the Hall Effect sensors 144 are mounted.

A magnet 146 is positioned into a channel 148 defined in base 142. Magnet 142 extends along the longitudinal direction LN in a manner that is adjacent to the arrangement of Hall Effect sensors 144. For this exemplary embodiment, magnet 146 has a length along the longitudinal direction LN that is slightly longer than the corresponding length of the arrangement of Hall Effect sensors 144 as shown in FIGS. 2 and 3. Hall Effect sensors 144 can be used to detect changes in the magnetic field provided by magnet 146. Such changes will be caused by e.g., one or more breaks in a ferrous reinforcement cord in the carcass of a tire.

Using FIG. 1 for example, sensor support 100 is positioned against inner surface 56 of sidewall 54 of tire 50. The shape of surface 56 causes flexible substrate 102 to bend against the force of biasing member 104 into a profile that matches the shape of the inner surface 56. This shape can be maintained by a force that maintains sensor support 100 against inner surface 56 and/or flexible substrate 102 can be locked into position using locking member 106 as previously described.

Tire 50 is then rotated past flexibly supported sensor 108 with the plurality of Hall Effect sensors 144 positioned against or in close proximity to inner surface 56. As shown, the plurality of Hall Effect sensors 144 are oriented along radial direction R or within a range of +/−6 degrees of the radial direction. As tire 50 rotates, changes in the magnetic field caused by a break in the radially-oriented, reinforcement cords will be detected by the Hall Effect sensors 144, which in turn will provide a signal that can be received by, for example, a processing device. The rotation of the tire can be synchronized with this signal so that the inspection reveals where on tire 50 a break in the cords has occurred.

This above described method for using sensor support 100 is provided by way of example. Other methods may be used as well as will be appreciated by one of skill in the art using the teachings disclosed herein. In addition, the present invention is not limited to the use of a sensor support for detecting cord damage and may be used to position one or more sensors near the surface of a tire for other types of inspection and/or testing as well.

Thus, while the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. For example, the biasing member 104 need not be an element separated from flexible supported sensor 108 as shown. Instead, flexible supported sensor 108 could be constructed to include a biasing member therein. Other variations of the invention may be configured as well. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A sensor support that is removably positionable near a surface of a tire, the sensor support comprising:
   a rotatably supported, flexible substrate defining a longitudinal direction, the flexible substrate bendable along the longitudinal direction between a first position and a second position and comprising a plurality of interlocking members connected together along the longitudinal direction and rotatable relative to one another;
   a biasing member attached to the substrate and configured for urging the substrate towards the first position; and
   at least one sensor attached to the flexible substrate, the sensor configured for detecting damage at or below the surface of the tire.

2. The sensor support that is removably positionable near the surface of a tire as in claim 1, further comprising:
   a locking member positioned proximate to the flexible substrate and configured for holding the flexible substrate in a second position wherein the flexible substrate conforms to a profile of the surface of the tire.

3. The sensor support that is removably positionable near the surface of a tire as in claim 1, wherein the biasing member extends along the longitudinal direction within the interlocking members interlocking.

4. The sensor support that is removably positionable near the surface of a tire as in claim 3, the flexible substrate defining a lateral direction that is perpendicular to the longitudinal direction, and wherein one or more of the interlocking members each comprise:
   a seat extending along the lateral direction between opposing sides of the interlocking member; and
   a pair of fingers positioned in an opposing manner on the opposing sides of the interlocking member, the pair of fingers extending over the seat along the lateral direction and towards each other;
   wherein the at least one flexibly supported sensor is positioned between the seat and the pair of fingers of adjacent interlocking members of the flexible substrate.

5. The sensor support that is removably positionable near the surface of a tire as in claim 4, wherein one or more of the interlocking members further comprise:
   an axle extending along the lateral direction between the opposing sides of the interlocking member; and
   a pair of jaws configured for rotatable receipt of another axle on an adjacent interlocking member wherein adjacent interlocking members along the flexible support are equipped for rotation relative to each other.

6. The sensor support that is removably positionable near the surface of a tire as in claim 5, wherein each axle of the one or more interlocking members defines an aperture into which the biasing member is received, the biasing member extending through the aperture of adjacent interlocking members along the longitudinal direction of the flexible substrate.

7. The sensor support that is removably positionable near the surface of a tire as in claim 1, wherein the flexible substrate comprises a plurality of apertures aligned along the longitudinal direction, and wherein the biasing member extends through the plurality of apertures along the longitudinal direction.

8. The sensor support that is removably positionable near the surface of a tire as in claim 1, wherein the biasing member comprises a leaf spring.

9. The sensor support that is removably positionable near the surface of a tire as in claim 1, further comprising:
   a base upon which the flexible substrate is rotatably supported.

10. The sensor support that is removably positionable near the surface of a tire as in claim 1, wherein the at least one flexibly supported sensor comprises:
    a plurality of Hall Effect sensors positioned in an arrangement that extends along the longitudinal direction of the flexible substrate.

11. The sensor support that is removably positionable near the surface of a tire as in claim 10, further comprising:
    a base to which the flexible substrate is rotatably attached; and
    a magnet supported by the base and extending along the longitudinal direction in an adjacent manner to the plurality of Hall Effect sensors.

12. The sensor support that is removably positionable near the surface of a tire as in claim 11, wherein the magnet has a length along the longitudinal direction that is greater than a length along the longitudinal direction of the arrangement of Hall Effect sensors.

13. The sensor support that is removably positionable near the surface of a tire as in claim 11, wherein the base defines a channel into which the magnet is received.

14. The sensor support that is removably positionable near the surface of a tire as in claim 11, further comprising a flexible printed circuit board to which the Hall Effect sensors are attached.

15. The sensor support that is removably positionable near the surface of a tire as in claim 1, the flexible substrate having opposing sides and defining a lateral direction that is perpendicular to the longitudinal direction, the sensor support further comprising:
    a base to which the flexible substrate is rotatably attached; and
    a locking member positioned proximate to the flexible substrate and configured for holding the flexible substrate in a second position wherein the flexible substrate conforms to a profile of the surface of the tire, wherein the locking member is supported by the base and comprises
    a clamping member, and
    a pneumatic cylinder in mechanical communication with the clamping member, the pneumatic cylinder configured for selectively positioning the clamping member against at least one of a pair of opposing sides of the flexible substrate to lock the flexible substrate into the second position.

* * * * *